United States Patent Office 3,754,042
Patented Aug. 21, 1973

---

3,754,042
HALONITROMETHYL CYCLOALKANES
Wilson F. Gum, Jr., and David A. Nelson, Midland, Mich., assignors to The Dow Chemical Company, Midland, Mich.
No Drawing. Filed Sept. 15, 1972, Ser. No. 289,322
Int. Cl. C07c 79/08
U.S. Cl. 260—644    8 Claims

ABSTRACT OF THE DISCLOSURE

Compounds corresponding to the formula

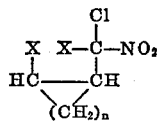

wherein each X independently represents chloro or bromo and $n$ represents an integer of 3 or 4 are prepared. The compounds have been found to be active insecticides, herbicides, bacteriocides, fungicides and nematocides.

---

Prior art

Various halonitromethylalkanes have been prepared by the reaction of halonitromethanes or ethanes with olefins as shown by Baskakov et al. Zhur. Obsch. Khim 29 1203 (1959). However, no stable halonitromethylcycloalkanes have been produced. The halonitromethanes themselves and their preparation have been taught in U.S. Pat. 3,159,686.

SUMMARY OF THE INVENTION

This invention is directed to halonitromethylcycloalkane compounds corresponding to the formula

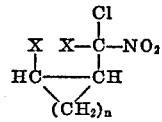

In this and succeeding formulae, each X independently represents chloro or bromo and $n$ represents an integer of 3 or 4.

The novel compounds of this invention are usually liquids having very slight solubility in water and good solubility in conventional organic solvents such as acetone, benzene, dichloromethane, carbon tetrachloride, ethanol and isopropanol. These novel compounds have utility in a wide variety of agricultural applications. Thus, some of the compounds are useful in agronomical practices for the selective control of various weeds. Many are also useful as fungicides, bacteriocides, nematocides and insecticides.

Representative novel compounds coming within the scope of the present invention include the following:

1-bromo-2-(dichloronitromethyl)cyclopentane;
1-chloro-2-(dichloronitromethyl)cyclopentane;
1-bromo-2-(bromochloronitromethyl)cyclopentane;
1-chloro-2-(bromochloronitromethyl)cyclopentane;
1-bromo-2-(dichloronitromethyl)cyclohexane;
1-chloro-2-(dichloronitromethyl)cyclohexane;
1-bromo-2-(bromochloronitromethyl)cyclohexane; and
1-chloro-2-(bromochloronitromethyl)cyclohexane.

The halonitromethylcycloalkane compounds of the present invention can be prepared by reacting a halopicrin (trichloronitromethane, dibromochloronitromethane or dichlorobromonitromethane) with a cycloalkene (cyclopentene or cyclohexene) in the presence of an irradiation light source, i.e. source of ultraviolet light. The reaction can be characterized as follows:

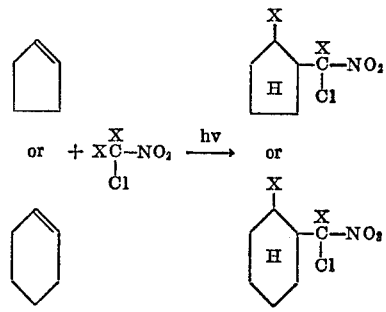

In carrying out this reaction, a solution is prepared containing the cycloalkene and the halopicrin in a solvent (reaction medium) such as, for example, benzene, n-hexane, toluene or heptane. The reaction solution is placed in a photochemical reaction vessel equipped with an ultraviolet light source, a cooling coil, a thermocouple, a nitrogen bubbler and agitation means.

Since the reaction consumes the reactants in amounts representing equimolecular proportions, these amounts for the most part can be employed. It has been found however that an increase in yield can be obtained by employing an excess of the halopicrin. Therefore, it is preferred to employ from 1 mole of the halopicrin per mole of the cycloalkene up to 3 moles or more of the halopicrin per mole of the cycloalkene.

The reaction is initiated by first sparging the reaction mixture with nitrogen for a period of from about 10 to about 30 minutes and thereafter irradiating the mixture for a period of from about 8 to about 25 hours while the temperature is maintained between about 25° and about 45° C. Upon completion of the reaction, the solvent is removed by evaporation under reduced pressure and the crude reaction product purified by multiple distillation, if desired.

Alternatively, the compounds can be prepared in higher yields by reacting the halopicrin and cycloalkene together in the presence of a redox-transfer catalyst such as, for example, cupric chloride in diethylamine hydrochloride and acetonitrile or cupric chloride in diethylamine. In carrying out this reaction, the reactants are contacted together in the presence of the catalyst and heated at reflux temperature, about 45° to 60° C. for from about 3 to about 20 hours. Thereafter, the reaction mixture is cooled, washed with dilute (5–20 percent) hydrochloric acid, followed by water washing and thereafter dried at 0° C. using a dessicant such as anhydrous potassium sulfate or magnesium sulfate. The product can be further purified if desired by distillation.

DESCRIPTION OF SOME PREFERRED EMBODIMENTS

The following examples serve to illustrate the practice of the present invention but are not intended to be limitations on the overall scope of the invention.

Example 1.—1-bromo-2-(dichloronitromethyl) cyclohexane

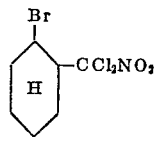

A solution was prepared containing 8.2 grams (0.1 mole) of cyclohexene and 62.7 grams (0.3 mole) of bromodichloronitromethane ($CCl_2BrNO_2$) in 50 milliliters of benzene. The solution was sparged with nitrogen for 10 minutes and thereafter irradiated with a sunlamp for 25 hours while the temperature was maintained at between 40° and 45° C. The reaction mixture was distilled to remove excess bromodichloronitromethane and redistilled obtaining a fraction boiling at 90°–100° C. at 0.2 millimeter of mercury (mm.). This fraction was further distilled to recover the 1-bromo-2-(dichloronitromethyl)cyclohexane product. This product upon analysis was found to have carbon, hydrogen, nitrogen, chlorine and bromine contents of 29.0, 3.35, 4.81, 23.1 and 27.9 percent, respectively, as compared with the theoretical contents of 28.9, 3.44, 4.82, 24.4 and 27.4 percent, respectively, calculated for the above named product. The product boils at 90°–92° C. at 0.2 mm. and has a refractive index of $n\ 25/D = 1.5369$. The structure was confirmed by nuclear magnetic resonance (N.M.R.) spectrum and infra-red analysis (IR).

The same product was obtained employing the same reactant in equimolar amounts.

In an analogous manner employing generally the method of Example 1 and the appropriate halopicrin and cycloalkene, the following compounds are prepared:

1-bromo-2-(bromochloronitromethyl)cyclohexane, having a boiling point of 110°–115° C. at 0.2 mm. and a refractive index of $n\ 25/D = 1.5572$ and 1-bromo-2-(dichloronitromethyl)cyclopentane, having a boiling point of 89°–91° C. at 0.5 mm. and a refractive index of $n\ 25/D = 1.5230$.

Example II.—1-bromo-2-(bromochloronitromethane) cyclopentane

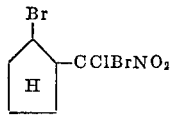

To a mixture of 17 grams (0.25 mole) of cyclopentene and 63.3 grams (0.25 mole) of dibromochloronitromethane was added a solution comprising 0.55 grams (0.005 mole) of diethylamine hydrochloride and 0.45 gram (0.02 mole) of cupric chloride in 15 milliliters of acetonitrile. The mixture was heated at reflux for 2 hours and thereafter cooled. The reaction mixture was washed twice with 200 milliliter portions of 2 molar hydrochloric acid followed by two water washes (300 milliliters each). The washed reaction medium was dried over anhydrous potassium sulfate under refrigeration at 0° C. and the unreacted dibromochloronitromethane removed by distillation at 40° C. and 1.0 mm. The 1-bromo-2-(bromochloronitromethyl)cyclopentane product was recovered by an additional distillation step and boils at 79°–80° C. at 0.1 mm. and has a refractive index of $n\ 25/D = 1.5471$. The structure of the compound was confirmed by N.M.R. and IR.

In an analogous manner employing generally the method of Example II and the appropriate halopicrin and cycloalkene, the following compounds are prepared.

1-chloro-2-(bromochloronitromethyl)cyclohexane having a molecular weight of ∼ 290.91;

1-chloro-2-(dichloronitromethyl)cyclopentane having a molecular weight of ∼ 232.44;

1-chloro-2-(dichloronitromethyl)cyclohexane having a boiling point of 102°–104° C. at 0.8 mm. and 1-chloro-2-(bromochloronitromethyl)cyclopentane having a molecular weight of ∼ 276.90.

The compounds of the present invention are employed as toxicants in herbicides, insecticides, bacteriocides, nematocides, and fungicides. For such uses, the compounds can be employed in an unmodified form or dispersed on a finely divided solid and employed as dusts. Such mixtures can also be dispersed in water with or without the aid of a surface active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing the toxicant in concentrations usually from about 0.1 to about 10,000 parts or more by weight of one or more of the compounds per million parts of such compositions.

In a representative operation, 1-bromo-2-(dichloronitromethyl)cyclopentane when employed as the sole toxicant in an aqueous dispersion at a concentration of 500 parts per million parts by weight was found to give substantial kill and control of southern armyworm larvae.

In additional operations, 1-bromo-2-(bromochloronitromethyl)cyclopentane when employed as the sole toxicant in an aqueous dispersion at a concentration of about 1 part per million parts by weight was found to give 100 percent kill and control of yellow fever mosquito larvae; and at a concentration of 500 parts per million parts by weight was found to give 100 percent kill and control of codling moths.

In another representative operation, each of the compounds 1-chloro-2-(dichloronitromethyl)cyclohexane, 1-bromo-2-(bromochloronitromethyl)cyclopentane, 1-bromo-2-(dichloronitromethyl)cyclopentane, 1-bromo-2-(bromochloronitromethyl)cyclohexane and 1-bromo-2-(dichloronitromethyl)cyclohexane when employed as the sole toxicant in a nutrient agar at a concentration of about 500 parts by weight per million parts of agar were found to give 100 percent kill and control of the organisms *Candida albicans, Trichophyton mentagrophytes, Bacillus subtilis, Candida pelliculosa, Pullularia pullulans, Mycobacterium pheli* and *Rhizopus nigricans*.

In additional operations employing the same toxicant concentrations in nutrient agar, each of the compounds 1-bromo-2-(bromochloronitromethyl)cyclohexane and 1-bromo-2-(dichloronitromethyl)cyclohexane were found to give 100 percent kill and control of the organisms *Staphylococcus aureus* and *Salmonella typhosa*.

In herbicidal use operations, each of the compounds 1-bromo-2-(bromochloronitromethyl)cyclopentane, 1-bromo-2-(dichloronitromethyl)cyclohexane and 1-bromo-2-(bromochloronitromethyl)cyclopentane when applied as the sole toxicant in an aqueous dispersion at a dosage rate of 4,000 parts by weight per million parts of the ultimate dispersion were found to give 100 percent kill and control of pigweed plants.

In additional operations, each of the compounds 1-bromo-2-(bromochloronitromethyl)cyclopentane and 1-chloro-2-(dichloronitromethyl)cyclohexane when applied post-emergent to barnyard grass, as the sole toxicant in an aqueous dispersion at a dosage rate equivalent to 20 pounds per acre were found to give excellent kill and control of the plants. In an additional operation 1-chloro-2-(dichloronitromethyl)cyclohexane was found to give 100 percent kill and control of yellow foxtail when applied at the same dosage as above.

In other operations, each of the compounds 1-bromo-2-(dichloronitromethyl)cyclohexane and 1-bromo-2-(bromochloronitromethyl)cyclohexane, when applied post-emergent to pigweed, as the sole toxicant in an aqueous dispersion at a dosage rate equivalent to 10 pounds per acre were found to give 100 percent kill and control of the plants.

In another representative operation, each of the compounds 1-bromo-2-(dichloronitromethyl)cyclohexane and 1-bromo-2-(dichloronitromethyl)cyclopentane were found to give 100 percent kill and control of the Rootknot nematode when soil containing the nematode was treated with one of the compounds as the sole toxicant in the amount of 3 parts by weight per million parts of the soil.

When applied at a dosage level of from about 500 to about 10,000 parts per million, each of the compounds of the present invention, the utility of which is not specifically recited hereinabove, has the ability to kill, inhibit or otherwise control one or more of the above said or other fungal, bacterial, insect, nematode, or weed pests.

What is claimed is:

1. A compound corresponding to the formula

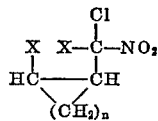

wherein each X independently represents chloro or bromo and $n$ represents an integer of 3 or 4.

2. The compound of claim 1 wherein $n$ represents the integer 3.

3. The compound of claim 2 which is 1-bromo-2-(bromochloronitromethyl)cyclopentane.

4. The compound of claim 2 which is 1-bromo-2-(dichloronitromethyl)cyclopentane.

5. The compound of claim 1 wherein $n$ represents the integer 4.

6. The compound of claim 5 which is 1-chloro-2-(dichloronitromethyl)cyclohexane.

7. The compound of claim 5 which is 1-bromo-2-(bromochloronitromethyl)cyclopentane.

8. The compound of claim 5 which is 1-bromo-2-(dichloronitromethyl)cyclohexane.

References Cited
UNITED STATES PATENTS

| | | | |
|---|---|---|---|
| 3,488,396 | 1/1970 | Frankel et al. | 260—644 |
| 3,646,228 | 2/1972 | Frankel et al. | 260—644 |

LELAND A. SEBASTIAN, Primary Examiner

U.S. Cl. X.R.

204—162 R; 260—999; 424—349

PO-1050
(5/69)

UNITED STATES PATENT OFFICE
CERTIFICATE OF CORRECTION

Patent No. 3,754,042           Dated   August 21, 1973

Inventor(s)   Wilson F. Gum, Jr. and David A. Nelson

It is certified that error appears in the above-identified patent and that said Letters Patent are hereby corrected as shown below:

Claim 7, line 2, delete "cyclopentane" and substitute --cyclohexane--.

Signed and sealed this 18th day of December 1973.

(SEAL)
Attest:

EDWARD M. FLETCHER, JR.
Attesting Officer

RENE D. TEGTMEYER
Acting Commissioner of Patents